No. 814,705. PATENTED MAR. 13, 1906.
W. W. IRWIN.
RAKE.
APPLICATION FILED SEPT. 22, 1904.
2 SHEETS—SHEET 1.
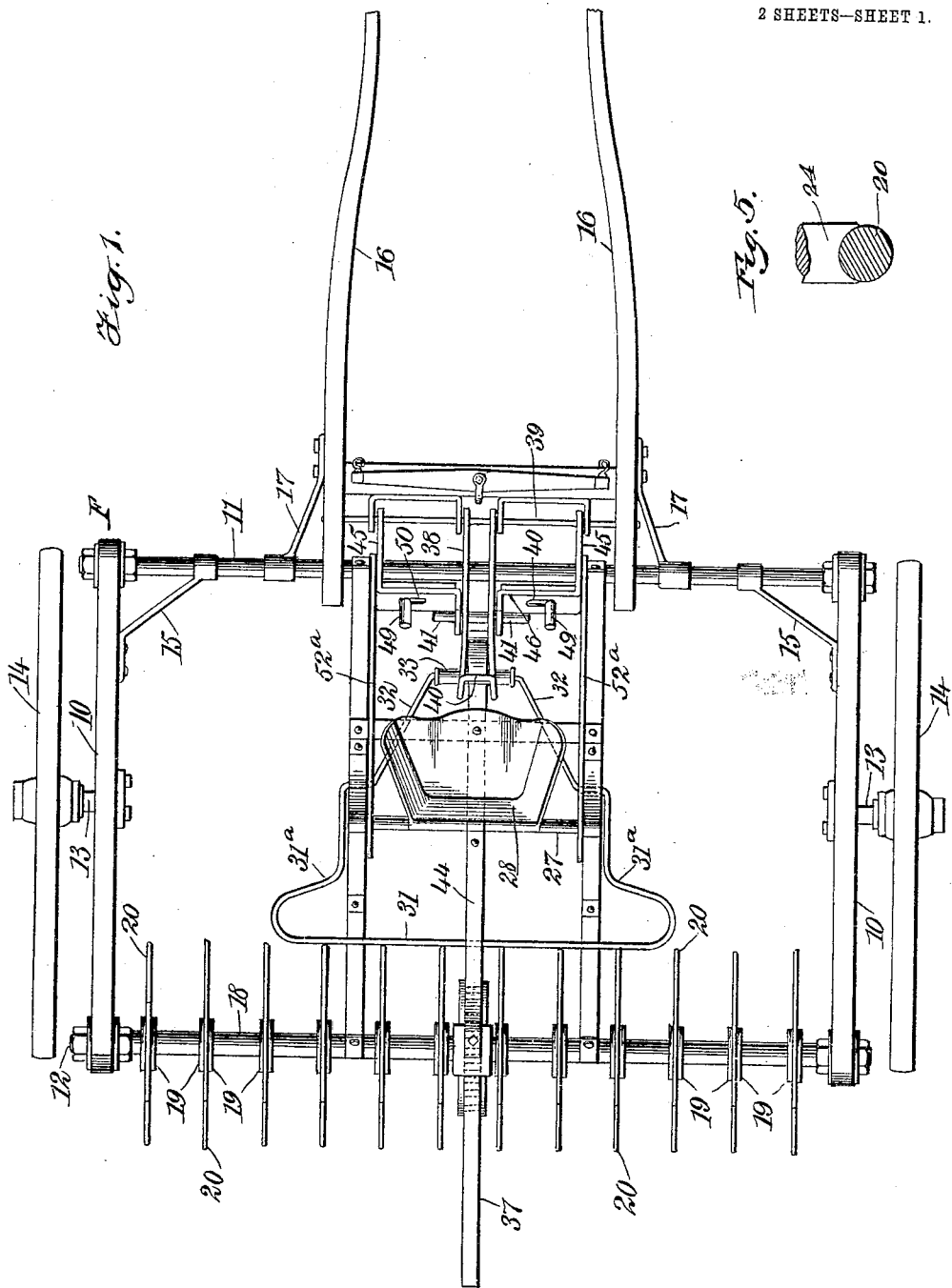
WITNESSES:
INVENTOR
William W. Irwin
BY
ATTORNEYS

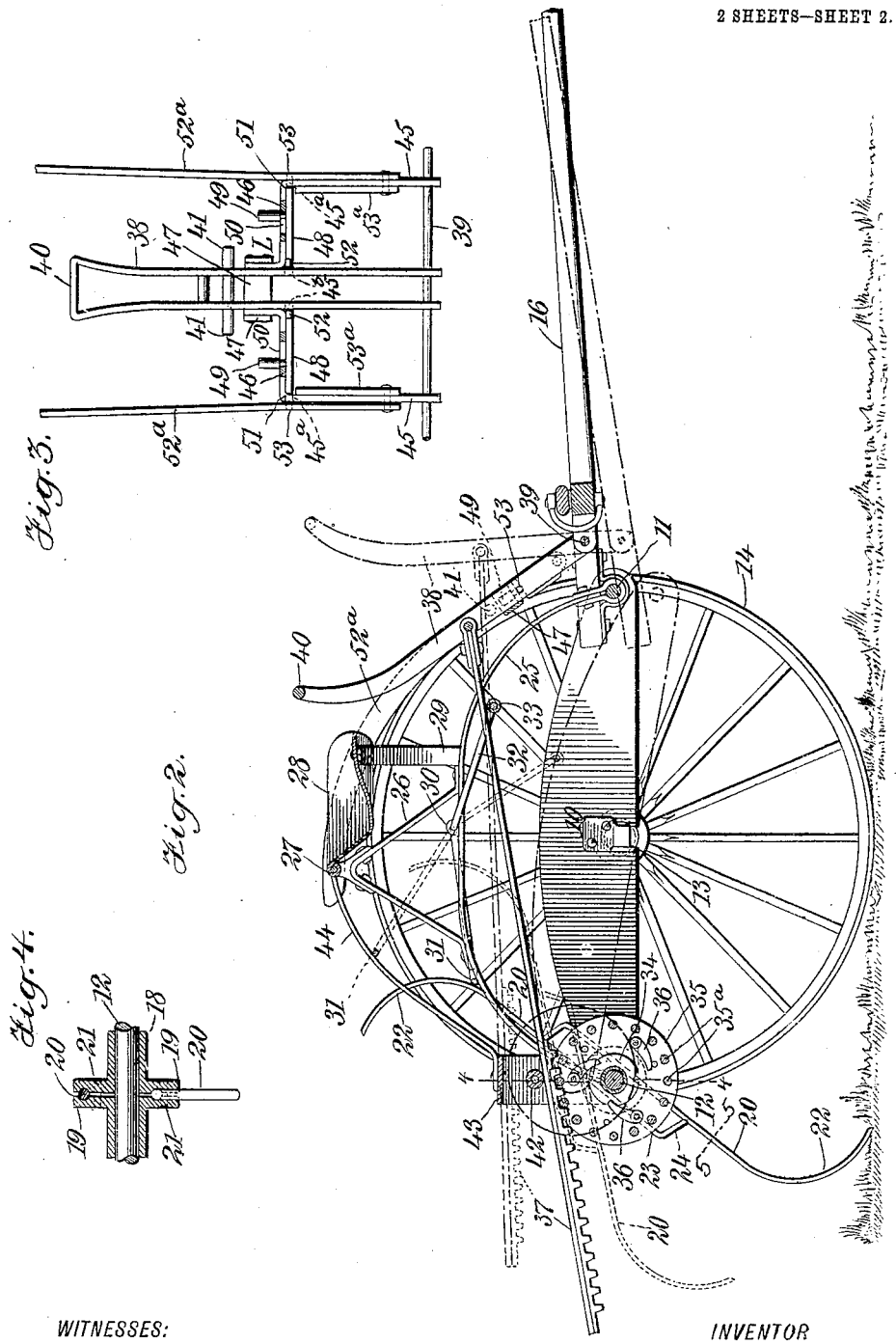

UNITED STATES PATENT OFFICE.

WILLIAM WESLY IRWIN, OF JUNEAU, DISTRICT OF ALASKA.

RAKE.

No. 814,705.  Specification of Letters Patent.  Patented March 13, 1906.

Application filed September 22, 1904. Serial No. 225,452.

*To all whom it may concern:*

Be it known that I, WILLIAM WESLY IRWIN, a citizen of the United States, and a resident of Juneau, in the District of Alaska, have invented a new and Improved Rake, of which the following is a full, clear, and exact description.

My invention relates to rakes, and particularly to those mounted upon wheels for operation by draft-animals. Its principal objects are to provide a strong and simple apparatus in which the teeth may be readily operated to release the accumulated material and in which said teeth may be raised bodily to clear the windrows and not drag down the piles when bunching.

Reference is to be had to the accompanying drawings, forming a part of this specification, in which similar characters of reference indicate corresponding parts in all the figures.

Figure 1 is a top plan view of one embodiment of my invention. Fig. 2 is a central vertical longitudinal section therethrough. Fig. 3 is a detail in broken front elevation of the operating-levers. Fig. 4 is a sectional detail on the line 4 4 of Fig. 2, and Fig. 5 is a sectional detail on the line 5 5 of Fig. 2.

F designates a frame which preferably consists of side bars 10 10, which are connected by front and rear cross-bars 11 and 12, respectively. From the outer face of each of the side bars project short axles 13 13, upon which rotate wheels 14 14. The frame may be strengthened by stays or braces 15, connecting the front bar to the side bars, and to said front bar are secured shafts 16, which may be braced by stays 17.

Surrounding the bar 12 and rotatable thereon is a sleeve 18, preferably formed in sections which have at their opposite ends pairs of flanges or cheek-plates 19 19, in which are pairs of registering grooves to receive oppositely-extending teeth 20 20, which are clamped between the plates by bolts 21, securing them together so that the teeth are fixed to the sleeve and revolve about the bar. Each of these teeth is curved at its outer end at 22 to a form best adapted for gathering the material to be raked and having at its opposite extremity an extension 23, provided with an angular end 24, in which is a depression to receive the companion tooth, which bears against it as it operates over the surface to be raked and is supported and strengthened thereby.

The bars 11 and 12 are shown as connected by upward frame extensions or bars 25 25, each of which extensions has fixed upon it a standard 26, these being connected by a rod 27. Upon this rod is mounted the rear of a suitable seat 28, the forward portion of which is supported by arms 29, extending at each side to the bars 25.

Pivoted by means of sockets 30, which may be fixed to the upper sides of the bars 25, is a cross-bar 31, which is shown as of sufficient length to extend for some distance across the frame and having its ends turned in at $31^a$ to enter the sockets. This bar member is continued within and below the sockets, as is shown at 32, the meeting extremities being conveniently connected by a sleeve 33. This bar 31 when resting upon the bars 25, as is shown in full lines in Fig. 2 of the drawings, lies in the path of revolution of the rake-teeth, and by the contact of one set holds the opposite set in the proper position to perform their raking function.

Fixed at the center of the sleeve 18 is a ratchet-wheel 34, and surrounding this ratchet-wheel is a gear, which is shown as made up of opposite disks 35 35, connected near their peripheries by pins $35^a$. Between the faces of the disks are pivoted pawls 36 for coaction with the ratchet-wheel. Resting upon the upper side and meshing with the pins of the gear is a rack-bar 37, which is pivotally connected at its forward end with a lever 38, fulcrumed upon a rod 39, extending between the shafts. This lever, as illustrated, is double, having at its upper end a handle portion 40 and at its opposite sides foot projections 41 41. The rack-bar may be held in contact with the gear by a roller 42, pressing against its upper side and mounted upon a frame 43, supported upon the sleeve 18, which turns through it, and retained in place by an arm 44, extending from its upper end to the seat-support. Fulcrumed upon the rod 39 is a second lever L, which is shown as made up of separated arms 45 45, connected by a cross-bar 46, which has at its center a socket 47 to receive the lever 38. Sliding upon the bar 46 at each side of the socket is a locking member 48, retained in place by pins 49, extending through slots 50 in the cross-bar and having enlarged upper portions situated above the slots and preventing downward movement of the locking member, these pins also serving to reciprocate said members. Each locking member has at its extremities pins 51 52, the former of which may extend through an opening 45ᵃ in one of the arms 45, while its companion may be moved into coaction with an opening 45ᵇ in the side of the lever 38. Each of the arms 45 is connected by a link 52ᵃ with the rod 27, joining the seat-standards. In this link is an opening 53, which may be brought into alinement with the opening 45ᵃ, the projection extending through both of them when the locking member is moved outwardly. The links may be provided with sockets 53ᵃ to limit the rearward movement of the arms 45.

When the machine is in operation, the teeth are held in their raking position by their contact with the bar 31, as has been previously described, the extension of the upper teeth taking a large portion of the raking strain. When sufficient material has been accumulated, it may be discharged by first raising the bar 31 toward the seat and then pressing forward the lever 38, the lever L being at this time secured to its links by the locking members being in their extreme outward positions, this also releasing the first-named lever, so it may move independently. The result of this movement is to revolve the teeth through a half-turn, which discharges their load and brings what was formerly the upper set to a lowered or raking position, where they are maintained by again throwing down the cross-bar. If the driver desires to raise the teeth clear of both the ground and windrows, it is only necessary for him to move the locking members inwardly, so that the lever L is released from engagement with its links and connected with the lever 38. Now upon forcing the handle 40 forward the teeth not only revolve, but the entire frame is swung with the axles upon the wheels as a pivot, raising the rear of said frame at such a distance from the ground that the teeth will be clear of the piles of material, this position being shown in dotted lines in Fig. 2. The absence of the axle-bar between side bars also avoids interference with the material. When it is again desired to resume operations, the locking members are moved in the opposite direction, permitting the teeth to be revolved to release the accumulation.

Having thus described my invention, I claim as new and desire to secure by Letters Patent—

1. The combination with a frame, of rake-teeth mounted thereon, means for holding the teeth in the operating position, means for revolving the teeth to release accumulated material, means for tilting the said frame, and means for separately connecting the revolving means and tilting means.

2. The combination with a frame, of rake-teeth mounted thereon, means for holding the teeth in the operating position, means for revolving the teeth to release accumulated material, means for raising the rake-frame, and means for separably connecting the revolving means and raising means.

3. The combination with a frame, of a supporting-axle, teeth carried by the frame, shafts connected with the frame, a seat-support projecting above the frame, a lever fulcrumed upon the shafts, and a link connecting the lever and seat-support.

4. The combination with a frame, of a supporting-axle, teeth carried by the frame, shafts connected with the frame, a seat-support projecting above the frame, a lever fulcrumed upon the shafts, a link connecting the lever and seat-support, and means for locking the link and lever together.

5. The combination with a frame, of a supporting-axle, teeth revolving upon the frame, shafts connected with the frame, a lever for revolving the teeth, a lever fulcrumed to the shafts and connected to the frame, and means for joining the levers to one another.

6. A rake comprising a series of opposite plates, and pairs of teeth clamped between the plates and extending at opposite sides thereof, the ends of the teeth contacting with the companion teeth at opposite sides of the plates.

7. A rake comprising a support, pairs of teeth extending upon opposite sides of the support and each tooth having a depression outside the support in which the companion tooth rests.

8. The combination with a frame including a cross-bar, of a supporting-axle, a sleeve rotatable about the cross-bar, teeth fixed to the sleeve, a gear rotatable about the bar, a rack meshing with the gear, a lever to which the rack is joined, shafts connected with the frame, a lever fulcrumed to the shafts and connected to the frame, and means for joining the levers to one another.

9. The combination with a frame including a cross-bar, of a supporting-axle, a sleeve rotatable about the cross-bar, teeth fixed to the sleeve, a gear rotatable about the bar, ratchet mechanism connecting the gear and sleeve, a rack meshing with the gear, a lever to which the rack is joined, shafts connected with the frame, a lever fulcrumed to the shafts and connected to the frame, and means for joining the levers to one another.

10. The combination with a frame provided with an upward extension, of a supporting-axle, revolving teeth, shafts connected with the frame, a lever, means for revolving the teeth from the said lever, a lever fulcrumed to the shafts and connected with the frame extension, and means for joining the levers to one another.

11. The combination of revoluble rake-teeth, means for holding the teeth in an operative position, means for revolving the teeth to release the accumulated material, means for bodily raising the teeth, and a connection between the revolving and raising means.

12. A rake comprising a support, and pairs of teeth extending upon opposite sides of the support, the ends of the teeth contacting with the companion teeth at opposite sides of the support.

In testimony whereof I have signed my name to this specification in the presence of two subscribing witnesses.

WILLIAM WESLY IRWIN.

Witnesses:
 CHAS. GOLDSTEIN
 G. C. TEAL.